(12) United States Patent
Alvin

(10) Patent No.: US 6,916,454 B2
(45) Date of Patent: Jul. 12, 2005

(54) METAL GAS SEPARATION MEMBRANE

(75) Inventor: Mary Anne Alvin, Pittsburgh, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 624 days.

(21) Appl. No.: 09/822,927

(22) Filed: Mar. 30, 2001

(65) Prior Publication Data

US 2002/0141919 A1 Oct. 3, 2002

(51) Int. Cl.$^7$ ............................. B01J 8/00; B01D 53/22
(52) U.S. Cl. ........................................ 422/211; 96/11
(58) Field of Search ................................ 422/211, 222; 95/55, 56, 116; 96/4, 8, 10, 11; 423/210, 248

(56) References Cited

U.S. PATENT DOCUMENTS

| | | |
|---|---|---|
| 2,848,620 A | 8/1958 | Backus |
| 2,958,391 A | 11/1960 | Rosset |
| 3,022,187 A * | 2/1962 | Eyrand et al. ............. 428/545 |
| 3,208,198 A | 9/1965 | Rubin |
| 3,241,298 A | 3/1966 | Pierce |
| 3,413,777 A | 12/1968 | Langley et al. |
| 3,477,288 A | 11/1969 | Krcal et al. |
| 3,713,270 A | 1/1973 | Farr et al. |
| 4,132,668 A | 1/1979 | Gryaznov et al. |
| 4,496,373 A | 1/1985 | Behr et al. |
| 4,589,891 A | 5/1986 | Iniotakis et al. |
| 4,689,150 A * | 8/1987 | Abe et al. ................. 210/490 |
| 4,699,637 A | 10/1987 | Iniotakis et al. |
| 4,711,719 A | 12/1987 | Leenaars et al. |
| 4,857,080 A | 8/1989 | Baker et al. |
| 4,865,630 A * | 9/1989 | Abe ............................. 96/11 |
| 4,880,441 A | 11/1989 | Kesting et al. |
| 4,971,696 A | 11/1990 | Abe et al. |
| 5,139,540 A | 8/1992 | Najjar et al. |
| 5,139,541 A | 8/1992 | Edlund |
| 5,217,506 A | 6/1993 | Edlund et al. |
| 5,259,870 A | 11/1993 | Edlund |
| 5,310,414 A | 5/1994 | Najjar et al. |
| 5,342,431 A * | 8/1994 | Anderson et al. ............... 95/45 |
| 5,358,553 A | 10/1994 | Najjar et al. |
| 5,393,325 A | 2/1995 | Edlund |
| 5,415,891 A | 5/1995 | Liu et al. |
| 5,451,386 A * | 9/1995 | Collins et al. ............... 423/237 |
| 5,487,774 A | 1/1996 | Peterson et al. |
| 5,498,278 A | 3/1996 | Edlund |
| 5,518,530 A | 5/1996 | Sakai et al. |
| 5,738,708 A | 4/1998 | Peachey et al. |
| 5,782,959 A | 7/1998 | Yang et al. |
| 5,782,960 A | 7/1998 | Ogawa et al. |
| 5,810,912 A | 9/1998 | Akiyama et al. |
| 5,827,569 A | 10/1998 | Akiyama et al. |
| 5,904,754 A | 5/1999 | Juda et al. |
| 5,931,987 A | 8/1999 | Buxbaum |
| 5,955,044 A | 9/1999 | Lucht et al. |
| 5,980,989 A | 11/1999 | Takahashi et al. |
| 5,989,319 A | 11/1999 | Kawae et al. |
| 5,997,614 A * | 12/1999 | Tuma et al. ...................... 96/4 |
| 6,066,592 A | 5/2000 | Kawae et al. |
| 6,083,297 A | 7/2000 | Valus et al. |
| 6,630,423 B2 * | 10/2003 | Alvin et al. ................. 502/325 |

* cited by examiner

Primary Examiner—Kevin P. Kerns

(57) ABSTRACT

An improved metal gas separation membrane for separating hydrogen from a gas steam includes a quantity of metal particles that are bonded together to form a porous body that is selectively permeable to hydrogen. The porous body may have a porosity that increases from a first surface to an opposite second surface. The metal gas separation membrane may additionally include a coating of ceramic particles on the first surface thereof to further decrease the porosity at the first surface. Alternatively, or in addition thereto, the metal gas separation membrane may include a thin foil or coating of a dense precious metal such as palladium, palladium-alloys, and the like applied thereto that is permeable by hydrogen according to a chemisorption-dissociation-diffusion transport phenomenon. Still alternatively, or in addition thereto, the porous body may include a catalytic enhancement that can interact with a gas stream to increase the concentration of hydrogen according to various catalytic reactions such as the water gas shift reaction and the ammonia decomposition reaction.

31 Claims, 3 Drawing Sheets

METAL GAS SEPARATION MEMBRANE

BACKGROUND OF THE INVENTION

1. Field of the Invention

The present invention relates generally to gas separation membranes and, more particularly, to a metal membrane for the separation of hydrogen gas from a gas stream.

2. Description of the Related Art

Membranes and membrane modules for the separation of hydrogen from other gases are generally known. In particular, useful membranes for hydrogen separation typically can be categorized as being of four general types: (i) polymeric, (ii) porous inorganic, (iii) self-supporting non-porous metal, and (iv) non-porous metal supported on a porous rigid matrix such as metal or ceramic.

Polymeric membranes are commonly used in the form of extended flat sheets of small diameter hollow fibers. Flat sheet polymeric membranes are most often incorporated into spiral-wound modules. Hollow fiber membranes are incorporated into hollow-fiber modules which are very similar in design to shell-and-tube heat exchangers.

Polymeric membranes and membrane modules for hydrogen separation suffer from a lack of high selectivity toward hydrogen over other gases, which results in a relatively impure product gas. Such membranes also suffer from a lack of stability at operating temperatures above 480° F. (250° C.) and chemical incompatibility with many chemicals such as hydrocarbons that are present in an impure hydrogen feed stream.

Porous inorganic-based membranes are typically fabricated from titania, zirconia, alumina, glass, molecular sieving carbon, silica and/or zeolites. All are fabricated with a narrow pore size distribution, with the porous inorganic membranes exhibiting high hydrogen permeability but low selectivity due to relatively large mean pore diameters. Such materials are brittle and thus susceptible to failure due to cracking, and the sealing and fixturing of such porous inorganic-based membranes limit their use to relatively low temperature applications.

Development of supported metal membranes has focused on the utilization of ceramic tubes coated with a thin film or foil of non-porous or dense palladium (Pd) or Pd-alloys. The ceramic support tube typically is of a graded porosity from one surface thereof to a second opposite surface. More specifically, the porosity of the ceramic support tube typically is at its least at the surface upon which the Pd or Pd-alloy is disposed, and the porosity of the tube increases from this surface to a maximum porosity on the surface opposite the layer of Pd. The layer of Pd or Pd-alloy is selectively permeable to hydrogen gas and is typically capable of withstanding temperatures of 1500–1600° F. (815–870° C.).

Such ceramic-supported metal membranes are typically housed in shell and tube modules and are fitted with compression gaskets to seal the membrane tube into the module to prevent leakage of the feed gas stream into the permeate gas stream. Potential leak paths between the feed and permeate gas streams can exist due to differences in the coefficients of thermal expansion of the ceramic tube and the metal compression fittings. Additionally, the ceramic support tubes are inherently brittle and can experience long-term thermal fatigue due to repetitive process or system start-up and shutdown cycles.

The mechanical adherence of the thin Pd or Pd-alloy layer upon the surface of the ceramic support tube requires secure attachment of the film or foil onto the surface of the ceramic, as well as the absence of pinholes or other mechanical rupturing that can occur during manufacture or use of the ceramic tube membrane.

For porous metal membranes such as porous stainless steel and microporous noble metals, Knudsen diffusion or combined Knudsen diffusion/surface diffusion are the primary mechanisms by which gas transport occurs across the membrane. For dense metal membranes such as Pd or Pd-alloy foil or film, however, the primary mechanism of gas transport through the metal layer is traditional chemisorption-dissociation-diffusion. Broadly stated, chemisorption-dissociation-diffusion transport involves chemisorption of hydrogen molecules onto the membrane surface, dissociation of hydrogen atoms into protons and electrons, transportation of the protons and electrons through the dense metal, reassociation of the protons and electrons into hydrogen molecules, and desorption of hydrogen molecules from the media. While Knudsen diffusion typically offers greater flow rates across a membrane than chemisorption-dissociation-diffusion, Knudsen diffusion suffers from reduced hydrogen selectivity as compared with chemisorption-dissociation-diffusion.

It is also known that the interaction of a gas stream with catalytic materials can increase the concentration of hydrogen within the reactant or process gas stream. Such catalytic materials enhance the water gas shift reaction whereby carbon monoxide is reacted with water to form carbon dioxide and hydrogen gas. Catalytic materials also promote the decomposition of ammonia which also increases the concentration of hydrogen.

Examples of such catalytic materials include platinum (Pt), palladium, rhodium (Rh) and the like. While it has been known to apply such catalytic materials to ceramic support substrates to form composite membranes, such composite membranes still suffer from the aforementioned problems associated with the application of Pd and Pd-alloy foils and films to ceramic support tubes.

It is thus desired to provide a hydrogen gas separation membrane having high hydrogen selectivity that overcomes the aforementioned problems associated with the application of Pd and Pd-alloys to ceramic support tubes. It is also desired to provide such a membrane that includes a catalytic enhancement incorporated therein.

SUMMARY OF THE INVENTION

In view of the foregoing, an improved metal gas separation membrane for separating hydrogen from a gas steam includes a quantity of metal particles in the form of fibers and/or powders that are compacted together and bonded with one another to form a porous body that is selectively permeable to hydrogen. The porous body may be of a constant porosity throughout or may have a porosity that is "graded," i.e., increases from a first surface to a second opposite surface. A porous body having a graded porosity advantageously provides a low porosity (and thus consequent high hydrogen selectivity) at the first surface without the high pressure drop that would be experienced by the hydrogen from the second surface to the first surface if the porous body had the same low porosity throughout its cross section. The graded porosity feature provides both high hydrogen selectivity and a high hydrogen flow rate.

This variation in porosity can result from the use of metal particles in the form of fibers and/or powders that gradually increase in size in going from the first surface to the second surface, or may result from the use of the same size particles that are compressed to a relatively lesser degree in going from the first surface to the second surface. The metal gas separation membrane may additionally include a coating of ceramic particles on the first surface thereof to further decrease the porosity at the first surface. Alternatively, or in addition thereto, the metal gas separation membrane may include a thin foil or coating of a dense precious metal such as palladium, palladium-alloys, and the like applied thereto that is permeable by hydrogen according to a chemisorption-dissociation-diffusion transport phenomenon. Still alternatively, or in addition thereto, the porous body may include a catalytic enhancement that can interact with a gas stream to increase the concentration or quantity of hydrogen in the gas stream according to various catalytic reactions such as the water gas shift reaction and the ammonia decomposition reaction.

The catalytic enhancement can be in the nature of catalytic materials that are dispersed throughout the porous body, are coated on the metal particles that make up the porous body, are in the form of a layer on a surface of the porous body with or without the addition of a ceramic washcoat therebetween, or can be in the form of an application of perovskite, zeolite, or spinel structures to the porous body.

An object of the present invention is to provide a metal gas separation membrane that is suited to high temperature applications.

Another object of the present invention is to provide a metal gas separation membrane that permits catalytic material to be incorporated directly into the membrane.

Another object of the present invention is to provide a metal gas separation membrane that can be configured in numerous ways to be selectively employed in specific operating environments.

Another object of the present invention is to provide a metal gas separation membrane that can be configured to have a porosity that varies from a first surface to a second opposite surface.

Another object of the present invention is to provide a metal gas separation membrane that is highly selective to hydrogen yet provides for relatively high flow rates of hydrogen therethrough.

Another object of the present invention is to provide a metal gas separation membrane to which a layer of precious metal that enhances chemisorption-dissociation-diffusion transport of hydrogen can be applied.

Another object of the present invention is to provide a metal gas separation membrane that includes catalytic material incorporated therein that interact with a gas stream to increase the concentration of hydrogen therefrom.

Another object of the present invention is to provide a metal gas separation membrane having discrete particles of catalytic material distributed throughout the membrane.

Another object of the present invention is to provide a metal gas separation membrane having catalytic material coated on metal particles that make up a porous body of the membrane.

Another object of the present invention is to provide a metal gas separation membrane having particles of catalytic material that are sinter bonded to one another and are formed into layers to make up a porous body of the membrane.

Another object of the present invention is to provide a metal gas separation membrane having a layer of catalytic material on a surface thereof.

Another object of the present invention is to provide a metal gas separation membrane having a ceramic washcoat on a surface thereof and a layer of catalytic material on the ceramic washcoat.

Another object of the present invention is to provide a metal gas separation membrane having a catalytic enhancement in the form of precious metals such as platinum, palladium, rhodium, and the like.

Another object of the present invention is to provide a metal gas separation membrane having a catalytic enhancement in the form of an application of at least one of perovskite, zeolite, and spinel structures.

Another object of the present invention is to provide a metal gas separation membrane formed of a plurality of metallic particles in the form of fibers and/or powder and that can be mounted on or that can incorporate a metal mesh or a perforated plate for purposes of support and other purposes.

Another object of the present invention is to provide a metal gas separation membrane that can be configured in various shapes such as tubes, plates, honeycomb structures, as well as other structures.

As such, an aspect of the present invention is to provide a gas separation membrane for separating hydrogen from a gas stream, the general nature of which can be stated as including a transmission member including a porous body of metal particles compacted and bonded together and a chemisorption-dissociation-diffusion coating. The porous body has a first surface and a second surface opposite one another, with the porosity of the porous body increasing from the first surface to the second surface. The metal particles include a quantity of metal fibers and/or metal powder, with the chemisorption-dissociation-diffusion coating being disposed on the first surface of the porous body. The gas separation membrane is structured to receive the gas stream against one of the chemisorption-dissociation-diffusion coating and the second surface and permeate a quantity of hydrogen through the gas separation membrane and out of the other of the chemisorption-dissociation-diffusion coating and the second surface.

Another aspect of the present invention is to provide a gas separation membrane for separating hydrogen from a gas stream, the general nature of which can be stated as including a transmission member that includes a porous body and a catalytic enhancement, the transmission member having a first surface and a second opposite surface. The porous body includes a plurality of metal particles compacted and bonded together, and the metal particles include a quantity of metal fibers and/or metal powder. The catalytic enhancement is structured to increase the concentration of hydrogen in the gas stream, and the gas separation membrane is structured to receive the gas stream against one of the first and second surfaces and permeate a quantity of hydrogen through the gas separation membrane and out of the other of the first and second surfaces.

Still another aspect of the present invention is to provide a method of separating hydrogen gas from a gas stream, the general nature of which can be stated as including the steps of flowing the gas stream into contact with a first surface of a transmission member, the transmission member including a porous body of metal particles compacted and bonded together, interacting the gas stream with a catalytic enhancement incorporated into the transmission member, and exhausting hydrogen gas out of a second opposite surface of the transmission member.

BRIEF DESCRIPTION OF THE DRAWINGS

A further understanding of the invention can be gained from the following description of the preferred embodiments when read in conjunction with the accompanying drawings in which.

Similar numerals refer to similar parts throughout the specification.

DESCRIPTION OF THE PREFERRED EMBODIMENTS

Figure 1:
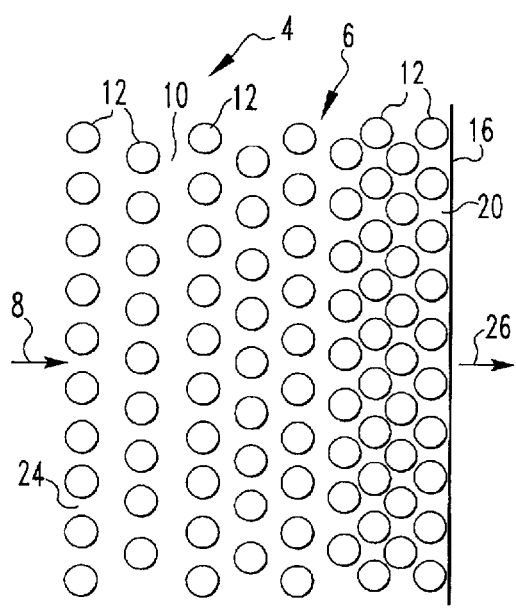
FIG. 1 is a schematic cross-sectional view of a first embodiment of a gas separation membrane in accordance with the present invention.

A first embodiment of a metal gas separation membrane 4 in accordance with the present invention is indicated generally in FIG. 1. The metal gas separation membrane 4 is advantageously configured to separate hydrogen gas from a gas stream 8. As will be set forth more fully below, the metal gas separation membrane 4 is also advantageously configured to be highly selective to hydrogen, meaning that it permits the permeation of hydrogen therethrough and resists the permeation of other gases. The metal gas separation membrane 4 further advantageously permits relatively high flow rates of hydrogen therethrough.

The metal gas separation membrane 4 includes a transmission member 6 that can be of numerous shapes, such as plates, tubes, honeycomb configurations, and other such shapes. The transmission member 6 is depicted schematically in cross-section FIG. 1, and it includes a porous body 10 made out of a plurality of metal particles 12 compressed and bonded together and a metal coating 16 on the porous body 10. The porous body 10 includes a first surface 20 and a second surface 24 opposite one another with the metal coating 16 being disposed on the first surface 20.

Figure 1A:
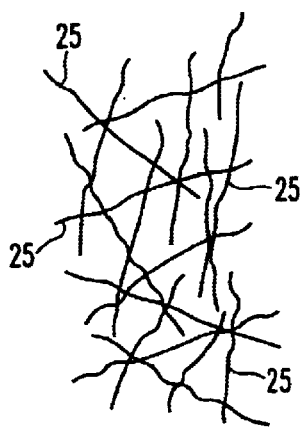
FIG. 1A is a schematic representation of a portion of a porous body of the first embodiment.

The metal particles 12 that make up the porous body 10 can be of numerous physical configurations such as metal fibers, metal powder, and other shapes, and the porous body 10 can be made up of one type of particle or combinations of these different-shaped metal particles 12. FIG. 1A schematically depicts an example of a portion of a porous body 10 that includes a quantity of metal fibers 25. The metal particles 12 can be fabricated from known superalloys and/or intermetallic materials to permit the porous body 10 to withstand high temperatures, meaning not only that the material does not melt at the elevated temperatures but also that the material resists corrosion in the potentially oxidizing or reducing environment in which the membrane 4 is used. It is understood, however, that other materials suited to different applications can be employed to manufacture the metal particles 12 without departing from the concept of the present invention.

The metal particles 12 are compacted and sinter bonded to form a thin, dense layer of material that makes up the porous body 10. The resultant porous body 10 has a thickness that is in the range of about 100 microns to 5 millimeters although other thicknesses may be appropriate depending upon the specific needs of the particular application. The aforementioned "thickness" thus refers generally to the distance between the first and second surfaces 20 and 24.

As can be seen in FIG. 1, the porosity of the porous body 10 is greater at the second surface 24 than at the first surface 20, meaning that the space between adjacent metal particles 12 near the second surface 24 is greater than the space between adjacent metal particles 12 near the first surface 20. Alternatively, the porous body 10 can be said to have a density that decreases in a direction from the first surface 20 toward the second surface 24. The porous body 10 depicted in FIG. 1 thus can be said to have a graded porosity or to be asymmetric.

As will be set forth more fully below, the porous body 10 is advantageously configured to provide relatively high hydrogen selectivity at the first surface 20 due to its relatively low porosity there. The regions of the porous body extending from the first surface 20 to the second surface 24, being relatively more porous than the first surface 20, have a relatively lower hydrogen selectivity but correspondingly permit the relatively free flow of gases therethrough. These relatively porous regions of the porous body 10 can thus be said to provide support to the low-porosity region of the porous body 10 at the first surface 20, which generally is relatively thin and of low strength, without meaningfully impeding the flow of hydrogen therethrough from the second surface 24 to the first surface 20. It thus can be seen that graded porosity feature of the porous body 10 advantageously provides a low porosity region (at the first surface 20) that has high hydrogen selectivity and is relatively thin to promote high hydrogen permeability therethrough, with this low-porosity region being supported by the relatively high-porosity region of the porous body 10 which does not impede the flow of hydrogen therethrough. As such, the graded porosity feature of the porous body 10 itself provides both high hydrogen selectivity and high hydrogen flow rates therethrough without the high pressure drop that would be experienced by the hydrogen if the porosity of the porous body 10 were that of the first surface 20 throughout the porous body 10.

As indicated hereinbefore, the metal particles 12 can include a quantity of metal fibers. Such fibers advantageously provide good mechanical strength at lower density (as compared with metal powder particles) due to the long aspect ratio of the fibers (the ratio of the length to the width) as well as due to the multiple joints by which each fiber is connected with other metal particles 12. The porous body 10 that includes fibers typically is more ductile due to the relatively lower density thereof.

As is shown in FIG. 1, the metal particles 12 are all of substantially the same size, and the variation in porosity between the first and second surfaces 20 and 24 results from compacting the metal particles 12 to a greater degree at the first surface 20 than at the second surface 24. In this regard, the porous body 10 can be manufactured out of several layers of metal particles 12, with each layer being compacted to a different degree, or other appropriate methodologies can be employed such as forming each layer out of a slurry of metal particles that are sequentially centrifuged onto a cylindrical mandrel, with the layers being centrifuged to different degrees.

The metal coating 16 is a thin dense layer or foil of a precious metal such as palladium, palladium-alloys, and the like that enhance gas phase chemisorption-dissociation-diffusion of hydrogen therethrough. As is know in the relevant art, the expression gas phase "chemisorption-dissociation-diffusion" of hydrogen refers to molecular chemisorption and dissociation of hydrogen along the high pressure side of the metal coating 16, proton and electron diffusion through the lattice of the metal coating 16, and proton and electron reassociation and recombination and desorption of molecular species along the opposite side of the metal coating 16. The metal coating 16 thus can be referred to as a chemisorption-dissociation-diffusion coating. The metal coating 16 can be applied to the porous body 10 in any of a variety of fashions such as via electroless plating, electroless plating with osmosis, electroplating, sputtering, electrodeposition, and the like, or other appropriate method if the coating is non-metallic.

In the embodiment depicted in FIG. 1, the metal gas separation membrane 4 receives the gas stream 8 against the second surface 24 and separates hydrogen from the gas stream 8 to form a permeate stream 26 of high purity hydrogen gas that flows out of the side of the metal coating 16 opposite the porous body 10. In this regard, the porous body 10 is configured to permit gases to freely flow through the spaces or pores between the metal particles 12. By way of example, the metal particles 12 may be in the form of fibers selected to be of a size in the range of about <1 to 50 microns in diameter and generally less than 10 millimeters in length and are compacted to an appropriate degree to permit such flow of gases therethrough. It is understood, however, that particles of different shapes and sizes may be employed without departing from the concept of the present invention.

Hydrogen that passes through the porous body 10 and reaches the first surface 20 is then permitted to flow through the metal coating 16 primarily by chemisorption-dissociation-diffusion transport. Hydrogen that has been transported fully through the metal coating 16 forms the permeate stream 26.

As is known in the relevant art, as the thickness of the metal coating 16 increases, the flow rate of hydrogen therethrough via chemisorption-dissociation-diffusion transport decreases. The metal coating 16 is thus preferably configured to be as thin as possible to enhance the flow rate of hydrogen therethrough while maintaining the mechanical integrity of the metal coating 16. The thickness of the metal coating 16 is thus preferably in approximately the range of 0.1 to 10 microns, although other thicknesses may be appropriate depending upon the specific needs of the particular application.

It can thus be seen that the porous body 10 serves to mechanically support the metal coating 16 thereon. In this regard, it can be seen that the metal particles 12 provide numerous points of contact between the porous body 10 and the metal coating 16, which helps the metal coating 16 to adhere onto the porous body 10 during operation of the metal gas separation membrane 4 and during the thermal expansion and contraction of the metal gas separation membrane 4 during start-up and shut-down operations. Further in this regard, the metal particles 12 and metal coating 16 preferably are configured to have comparable coefficients of thermal expansion in order to limit mechanical stresses between the porous body 10 and the metal coating 16, although this is not strictly necessary to achieve the beneficial aspects of the present invention.

As indicated hereinbefore, the metal coating 16 is depicted in FIG. 1 as being disposed on the first surface 20. Alternatively, the metal gas separation membrane 4 can be operated to have gas flow through the transmission member 6 in a direction opposite that depicted in FIG. 1, meaning that the gas stream 8 could be delivered to the exposed surface of the metal coating 16, and the permeate stream 26 would thus flow out of the second surface 24 of the porous body 10.

From the foregoing, it can be seen that the metal gas separation membrane, in its simplest form, could comprise solely a porous body being manufactured out of metal particles and having a constant density and porosity throughout, with the porous body serving as the transmission member that separates hydrogen from a gas stream. In addition thereto, the porous body may be of a graded density to reduce the pressure drop across the porous body 10 and/or can additionally include the metal coating 16 to further increase hydrogen selectivity. As such, the configuration of the metal gas separation membrane 4 can be varied to have differing characteristics such as hydrogen selectivity, hydrogen flow rate, suitability to high temperatures, and the like, as well as other characteristics, that are suited to the particular environment in which the metal gas separation membrane 4 is used by varying one or more of the physical characteristics of the transmission member 6.

The metal gas separation membrane 4 thus provides a device that can be specifically configured to have desirable characteristics as to hydrogen selectivity, hydrogen flow rate, and suitability for high temperatures, as well as other characteristics. The metal gas separation membrane 4 overcomes many of the problems associated with previous gas separation membranes by providing relatively close correspondence in the coefficients of thermal expansion of the porous body 10 and the metal coating 16, and by promoting the adherence of the metal coating 16 onto the porous body 10. The metal gas separation gas membrane 4 thus provides increased functionality and versatility.

Figure 2:
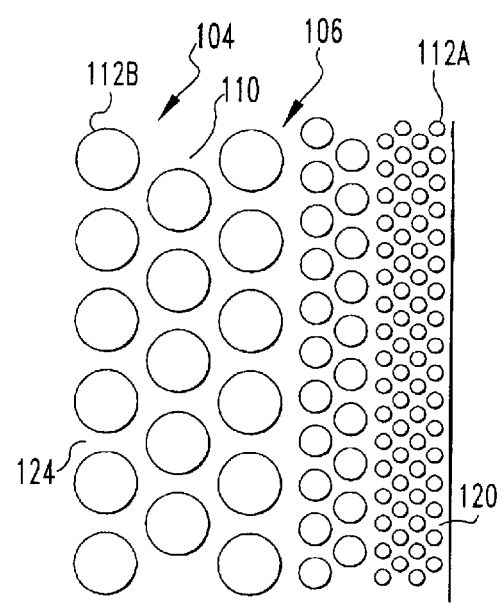
FIG. 2 is a schematic cross-sectional view of a second embodiment of a gas separation membrane in accordance with the present invention.

A second embodiment of a metal gas separation membrane 104 in accordance with the present invention is indicated generally in FIG. 2. The metal gas separation membrane 104 is similar to the metal gas separation membrane 4 except that the metal gas separation membrane 104 includes a transmission member 106 having a porous body 110 in which the graded porosity thereof is achieved in a different fashion than that of the porous body 10. More specifically, the metal particles 112 of the porous body 110 vary in size from relatively finer metal particles 112A at the first surface 120 to relatively coarser metal particles 112B at the second surface 124.

By way of example, the relatively finer metal particles 112A may be in the form of fibers of a size in the range of about 25 to 100 nanometers in diameter and <1 to 5 millimeters in length, and the relatively coarser particles 112B may be in the form of fibers of a size in the range of about <1 to 50 microns in diameter and <10 millimeters in length. Particles of other sizes and shapes may, however, be used without departing from the concept of the present invention.

It can thus be seen that if all of the metal particles of the porous body 110 are compacted to the same degree, the spaces between the relatively coarser metal particles 112B will be larger than the spaces between the relatively finer metal particles 112A. The porous body 110 thus is of a graded density or porosity between the first and second surfaces 120 and 124. While it is understood that the porous body 110 likely will be manufactured in several layers of metal particles varying from relatively finer to relatively coarser, other methodologies may be employed to manufacture the porous body 110 without departing from the concept of the present invention.

Figure 3:
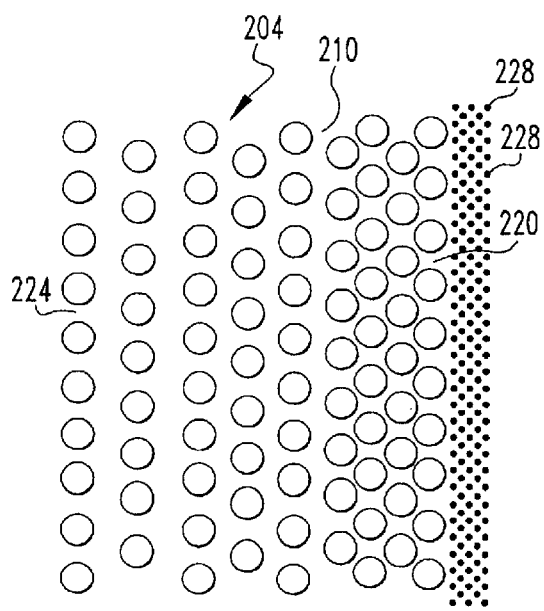
FIG. 3 is a schematic cross-sectional view of a third embodiment of a gas separation membrane in accordance with the present invention.

A third embodiment of a metal gas separation membrane 204 in accordance with the present invention is indicated generally in FIG. 3. The metal gas separation membrane 204 is similar to the metal gas separation membrane 4, except that the metal gas separation membrane 204 includes a layer of ceramic particles 228 instead of employing the metal coating 16. The ceramic particles 228 are either of a physically smaller size than any of the metal particles of the porous body 210, or the ceramic particles 228 are compacted to a greater degree than any of the metal particles such that the layer of ceramic particles 228 has an even lower porosity than any other region of the porous body 210. The layer of ceramic particles 228 thus defines the first surface 220 of the porous body 210, with the porosity at the first surface 220 being less than the porosity at the second surface 224 of the porous body 210.

Figure 3A:
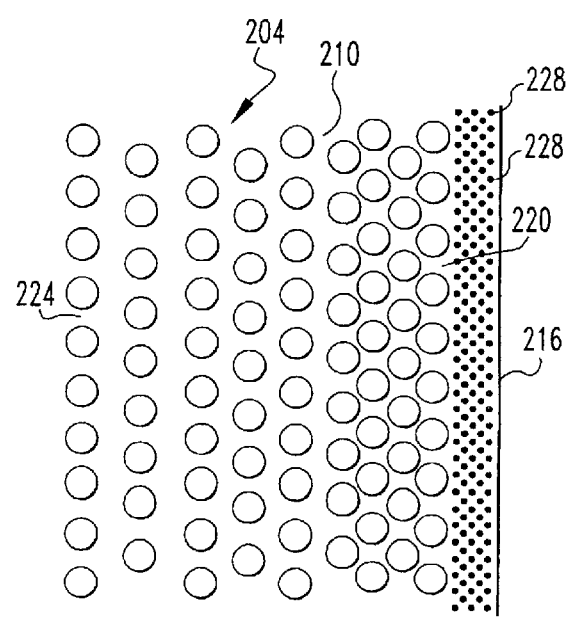
FIG. 3A is an alternate configuration of the third embodiment.

The layer of ceramic particles 228 thus advantageously provides high hydrogen selectivity in the porous body 210 in a fashion similar to that set forth above, i.e., by providing a layer of relatively low porosity that is supported by relatively high porosity regions of the porous body 210. As can be seen in FIG. 3A, the metal gas separation membrane 204 may additionally include a metal coating 216 similar to the metal coating 16 on the layer of ceramic particles 228. Alternatively, or in addition thereto, the metal particles of the porous body 210 may be of a constant porosity throughout or may be of a graded porosity that results from variation in the size of the metal particles in a fashion similar to the porous body 110 of the metal gas separation membrane 104.

Figure 4:
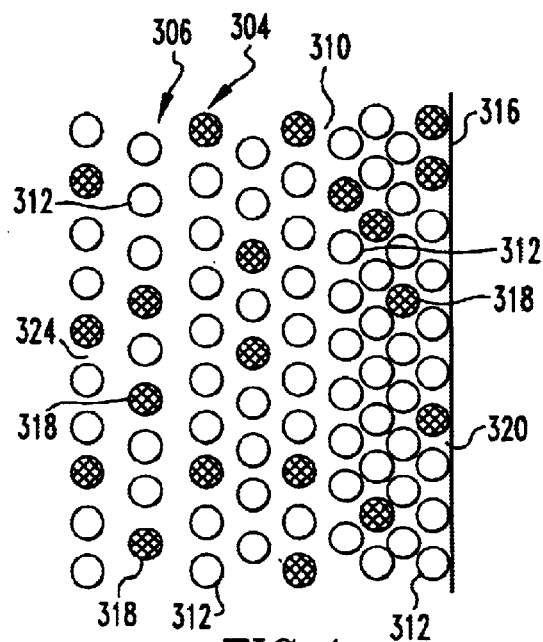
FIG. 4 is a schematic cross-sectional view of a fourth embodiment of a gas separation membrane in accordance with the present invention.

A fourth embodiment of a metal gas separation membrane 304 in accordance with the present invention is indicated generally in FIG. 4. The metal gas separation membrane 304 is similar to the metal gas separation membrane 4, in that it includes a transmission member 306 having a porous body 310 with a porosity that is greater at a second surface 324 than at a first opposite surface 320, and including a metal coating 316. The metal gas separation membrane 304 is different, however, in that it additionally includes a catalytic enhancement in the form of a plurality of particles of catalytic material 318 that are interspersed throughout the porous body 310. The particles of catalytic material 318 are particles of precious metals such as platinum, palladium, rhodium and the like that preferably are of a substantially similar size to the other metal particles 312 of the porous body 310, although it is understood that the particles of catalytic material 318 can be of greater or lesser size than the metal particles 312 without departing from the concept of the present invention. Moreover, the particles of catalytic material 318 may be one or more of perovskite, zeolite, and spinel structures. Still further, the particles of catalytic material 318 may be incorporated into the metal gas separation membrane 304 with a wash coat carrying the particles of catalytic material 318 and applied to the metal gas separation membrane 304.

The catalytic enhancement advantageously increases the concentration of hydrogen gas from a gas stream by promoting catalytic reactions such as the water gas shift reaction, the ammonia decomposition reaction, as well as other types of catalytic reactions. Gases in the gas stream that are at least partially composed of hydrogen come into contact with the particles of catalytic material 318 and are interacted therewith to produce reaction products that result in an increase in the quantity of available hydrogen for permeation through the metal gas separation membrane 304 to form a permeate stream. In alternate embodiments, the metal gas separation membrane 304 may be configured to not include the metal coating 316 and/or may additionally include a layer of ceramic particles similar to the layer of ceramic particles 228. In still other embodiments, the porous body 310 may be of a constant porosity throughout.

Figure 5:
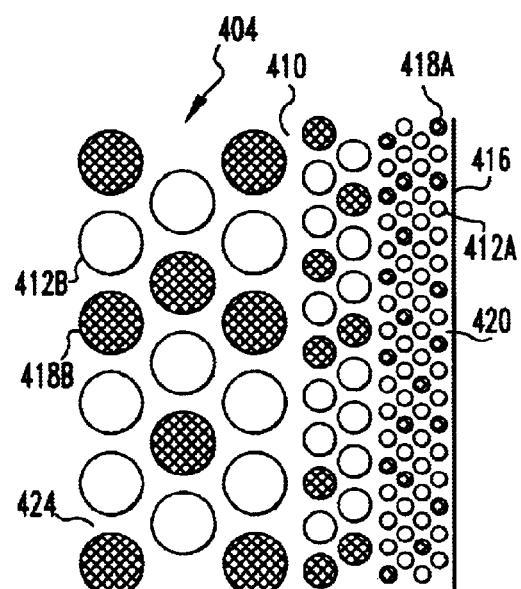
FIG. 5 is a schematic cross-sectional view of a fifth embodiment of a gas separation membrane in accordance with the present invention.

A fifth embodiment of a metal gas separation membrane 404 in accordance with the present invention is indicated generally in FIG. 5. The metal gas separation membrane 404 is similar to the metal gas separation membrane 304 in that the metal gas separation membrane 404 includes a porous body 410, having a porosity that is greater at a second surface 424 than at an opposite first surface 420 and includes a metal coating 416, except that the variation in porosity of the porous body 410 results from variation in the size of the metal particles in a fashion similar to the porous body 110. More specifically, the porous body 410 includes metal particles ranging in size from a relatively finer particle 412A at the first surface 420 to a relatively coarser metal particle 412B at the second surface 424.

The catalytic enhancement incorporated into the metal gas separation membrane 404 is in the form of particles of catalytic material that corresponds in size with the metal particles of the porous body 410. More specifically, the relatively finer particles of catalytic material 418A are disposed in substantially close proximity with the relatively finer metal particles 412A in the porous body 410. Similarly, the relatively coarser particles of catalytic material 418B are disposed in substantially close proximity with the relatively coarser metal particles 412B. The resultant porous body 410 is similar in configuration to the porous body 110, except including a catalytic enhancement in the form of the relatively finer and coarser particles of catalytic material 418A and 418B that are appropriately distributed throughout the porous body 410 for catalytic interaction with the gas stream to increase the concentration of hydrogen therefrom. Other embodiments are possible for the metal gas separation membrane 404, such as the elimination of the metal coating and/or the addition of a layer of ceramic particles.

Figure 6:
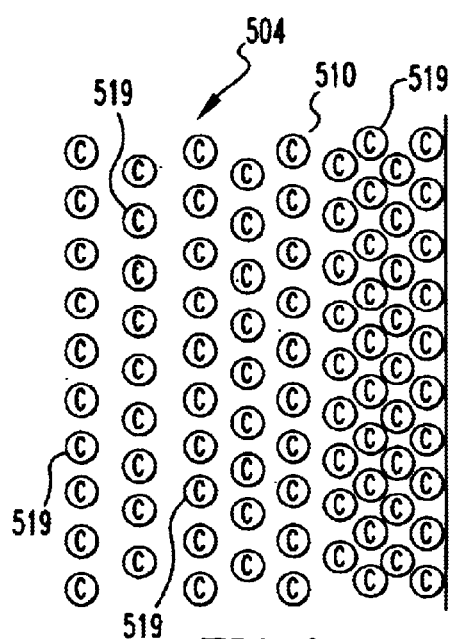
FIG. 6 is a schematic cross-sectional view of a sixth embodiment of a gas separation membrane in accordance with the present invention.

A sixth embodiment of a metal gas separation membrane 504 in accordance with the present invention in indicated generally in FIG. 6. The metal gas separation membrane 504 is similar to the metal gas separation membrane 4, except that the metal gas separation membrane 504 includes a catalytic enhancement in the form of metal particles coated with catalytic material 519 within the porous body 510.

As set forth above, the porous body 10 of the metal gas separation membrane 4 includes a plurality of metal particles 12 that are compacted and bonded to one another. The porous body 510 is different in that the metal particles are coated with catalytic material such as platinum, palladium, rhodium, and the like as set forth herein. The catalytic material is applied to the metal particles by methods such as electroplating and the like, with the catalytically coated metal particles then being compacted and bonded with one another to form the porous body 510. Instead of coating the individual particles, in other embodiments the catalytic material may be applied in one of the aforementioned fashions directly to the porous body 510 subsequent to the compaction and bonding of the metal particles.

The metal particles coated with catalytic material 519 are depicted schematically in FIG. 6 as discrete particles having a "c" therein, and all of the metal particles in FIG. 6 are depicted as being catalytically enhanced. It is understood that in other embodiments of the metal gas separation membrane 504, some of the metal particles of the porous body 510 may remain uncoated with the catalytic material, and in still other embodiments the catalytic enhancement may additionally include discrete particles of catalytic material such as the particles of catalytic material 318 described above. Still other embodiments of the metal gas separation membrane 504 may eliminate the metal coating and/or may include a layer of ceramic particles similar to the ceramic particles 228 described above. The metal particles coated with catalytic material 519 of the porous body 510 provide a substantial area of catalytic material for contact with the gas stream and promotion of catalytic reactions therewith while using relatively smaller quantities of the catalytic material as compared with the metal gas separation membrane 304.

Figure 7:
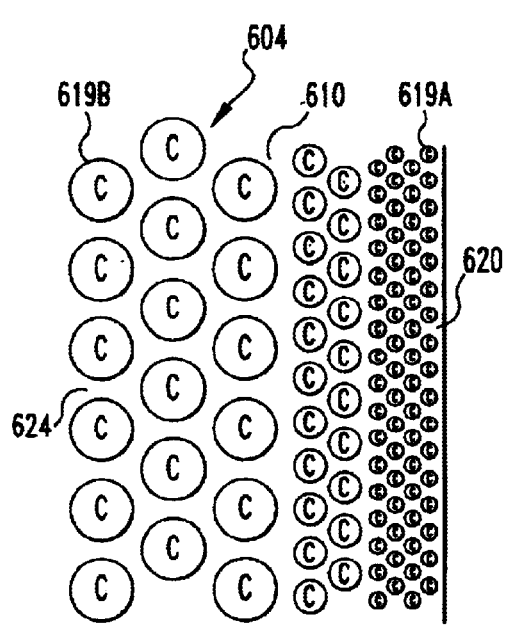
FIG. 7 is a schematic cross-sectional view of a seventh embodiment of a gas separation membrane in accordance with the present invention.

A seventh embodiment of a metal gas separation membrane 604 in accordance with the present invention is indicated generally in FIG. 7. The metal gas separation membrane 604 is similar to the metal gas separation membrane 504 in that the metal gas separation membrane 604 includes a porous body 610 having a plurality of metal particles coated with catalytic material therein, in which the porosity of the porous body is greater at the second surface 624 than at the first surface 620 thereof. Nevertheless the variation in porosity of the porous body 610 results from metal particles of different sizes in a fashion similar to the porous body 110. As such, the porous body 610 includes relatively finer metal particles coated with catalytic material 619A disposed at a first surface 620, with the size of the metal particles gradually increasing toward the second surface 624 where a plurality of relatively coarser metal particles coated with catalytic material 619B are disposed. Other similar embodiments for the metal gas separation membrane 604 are possible, as set forth above.

Figure 8:
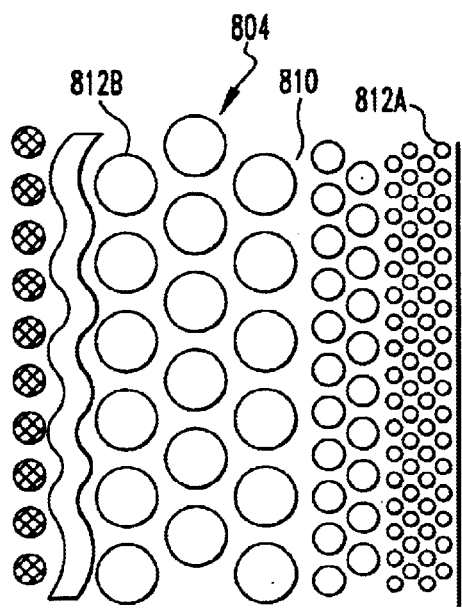
FIG. 8 is a schematic cross-sectional view of a eighth embodiment of a gas separation membrane in accordance with the present invention.

An eighth embodiment of a metal gas separation membrane 704 in accordance with the present invention is indicated generally in FIG. 8. The metal gas separation membrane 704 is similar to the metal gas separation 4 in that it includes a transmission member 706 having a porous body 710 with first and second surfaces 720 and 724, with a metal coating 716 disposed on the first surface 720. The metal gas separation membrane 704 is different than the metal gas separation membrane 4, however, in that the metal gas separation membrane 704 additionally includes a ceramic washcoat 732 on the second surface 724, and additionally includes a catalytic enhancement in the form of a layer of catalytic material 736 on the ceramic washcoat 732.

The layer of catalytic material 736 is depicted in FIG. 8 as including a plurality of particles of precious metal such as platinum, palladium, rhodium, and the like that promote the catalytic reactions described above that increase the concentration of hydrogen within the gas stream. Alternatively, however, the layer of catalytic material 736 may include metal particles that have been coated with catalytic materials, such as those shown in conjunction with the catalytically enhanced metal gas separation membranes 504 and 604. Still alternatively, the layer of catalytic material 736 may be in the form of an application of one or more of perovskite, zeolite, and spinel structures. Still alternatively, the ceramic washcoat 732 may be eliminated, and the layer of catalytic material 736 disposed directly on the second surface 724. While the ceramic washcoat 732 is depicted for purposes of simplicity and clarity in FIG. 8 as being a substantially continuous layer without voids or discontinuities, it is understood that the ceramic washcoat 732 will likely be in the form of ceramic materials that are coated on the individual particles of the porous body 710, and thus likely will includes a plurality of discontinuities or holes therein.

Figure 9:
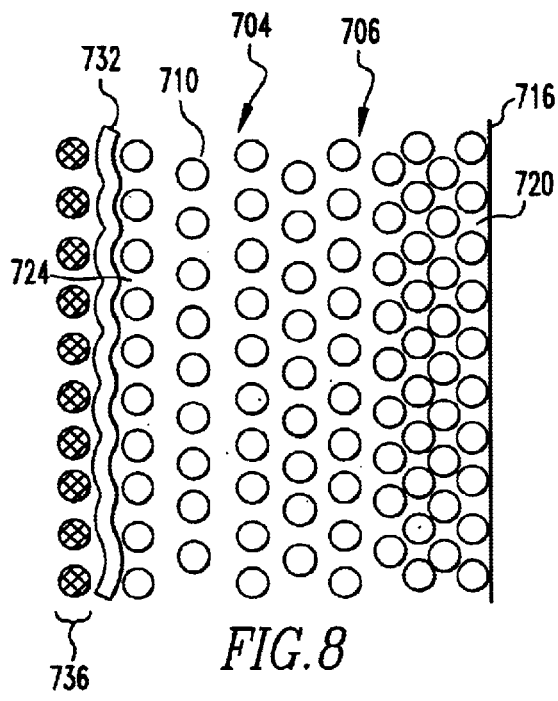
FIG. 9 is a schematic cross-sectional view of a ninth embodiment of a gas separation membrane in accordance with the present invention.

A ninth embodiment of a metal gas separation membrane 804 in accordance with the present invention is indicated generally in FIG. 9. The metal gas separation membrane 804 is similar to the metal gas separation membrane 704, except that the metal gas separation membrane 804 includes a porous body 810 having a graded porosity that results from the use of relatively finer particles 812A at one surface thereof and relatively coarser metal particles 812B at a second opposite surface thereof in a fashion similar to the porous body 110. It is understood that alternate embodiments of the metal gas separation membrane 804 are possible, such as those that might include a layer of ceramic particles such as the ceramic particles 208 and/or from which the metal coating may be eliminated.

Figure 10:
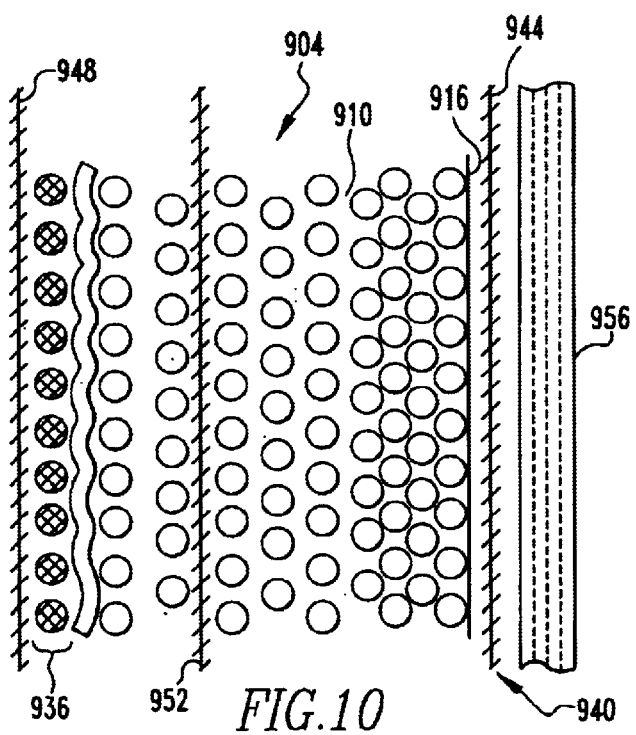
FIG. 10 is a schematic cross-sectional view of a tenth embodiment of a gas separation membrane in accordance with the present invention.

A tenth embodiment of a metal gas separation membrane 904 in accordance with the present invention is indicated generally in FIG. 10. The metal gas separation membrane 904 is similar to the metal gas separation membrane 704, except that the metal gas separation membrane 904 is mounted on a support structure 940. Depending upon its configuration, the porous body 910 may not be particularly rigid, and the support structure 940 thus provides additional support to the porous body 910 to avoid the need to configure the porous body 910 to be strictly self-supporting. The support structure 940 includes a first support member 944, a second support member 948, a third support member 952, and a fourth support member 956.

As can be seen in FIG. 10, the metal coating 916 of the metal gas separation membrane is mounted on the first support member 944, whereby the first support member 944 helps to structurally support the metal gas separation membrane 904. The first support member 944 may be in the form of wires or a mesh-type member, or may be of other appropriate configurations depending upon the specific needs of the particular application.

FIG. 10 also shows that the layer of catalytic material 936 is disposed against and is mounted on the second support member 948. The second support member 948 may be of a configuration similar to the first support member 944 or may be different therefrom. FIG. 10 further shows that the third support member 952 extends through the porous body 910, whereby the porous body 910 is mounted on the third support member. The third support member 952 may be of a configuration similar to the first and/or second support members 944 and 948, or may be different therefrom.

FIG. 10 additionally shows the first support member 944 being mounted on the fourth support member 956, which may be in the form of a plate with slots or perforations, or may be of another appropriate configuration. The fourth support member 956 thus serves to provide additional support to the metal gas separation membrane 904, along with the first, second, and third support members 944, 948 and 952.

It is further understood that in other embodiments the support structure 940 may include fewer than all of the first, second, third, and fourth support members 944, 948, 952, and 956. More specifically, the metal gas separation membrane 904 may be mounted directly on the fourth support member 956 without the first, second, and third support members 944, 948, and 952 being employed. Still alternatively, and by way of further example, the metal gas separation membrane may be supported solely on the third support member 952. It is thus understood that the support structure 940 can be of numerous configurations that are suited to specific needs of particular applications. It is further understood that any of the foregoing metal gas separation membranes 4, 104, 204, 304, 404, 504, 604, 704, and 804 may be mounted on the support structure 940.

From the foregoing, it can be seen that numerous embodiments of metal gas separation membranes have been disclosed herein, and it is further understood that numerous other metal gas separation membranes may be configured by combining one or more of the features set forth herein. As indicated above, the metal gas separation membrane in its simplest form includes a porous body of metal particles having a constant porosity throughout. In addition thereto, the porosity of the porous body may vary from a first surface to a second opposite surface. Still alternatively, or in addition thereto, the porous body may include a layer of palladium, palladium-alloy, and the like which enhances gas phase chemisorption-dissociation-diffusion of hydrogen therethrough. Still alternatively, or in addition thereto, the porous body may include a coating in the form of a plurality of ceramic particles thereon that further reduce the porosity of the porous body. Still alternatively, or in addition thereto, the metal gas separation membrane may include a catalytic enhancement of various configurations. Still alternatively, or in addition thereto, the metal gas separation membrane may be mounted on a support structure to assist the metal gas separation membrane to withstand the operating pressures and temperatures of a particular application.

It thus can be seen that various metal gas separation membranes can be configured with particular characteristics for hydrogen selectivity, hydrogen flow rate, and the ability to avoid corrosion and other deleterious effects that ordinarily may occur elevated temperatures and pressures, depending upon the specific combination of features that is employed in the metal gas separation membrane. It can additionally be seen that the metal gas separation membranes can be variously configured according to considerations of cost.

While a number of particular embodiments of the present invention have been described herein, it is understood that various changes, additions, modifications, and adaptations may be made without departing from the scope of the present invention, as set forth in the following claims.

What is claimed is:

1. A gas separation membrane for separating hydrogen from a gas stream, the gas separation membrane comprising:
   a transmission member including a porous body of metal particles compacted and bonded together and a chemisorption-dissociation-diffusion coating;
   the porous body having a first surface and a second surface opposite one another, the porosity of the porous body increasing from the first surface to the second surface, the metal particles including a quantity of at least one of metal fibers and metal powder;
   the chemisorption-dissociation-diffusion coating being disposed on the first surface; and
   the gas separation membrane being structured to receive the gas stream against one of the chemisorption-dissociation-diffusion coating and the second surface and permeate a quantity of hydrogen through the gas separation membrane and out of the other of the chemisorption-dissociation-diffusion coating and the second surface, the chemisorption-dissociation-diffusion coating being structured to permit chemisorption-dissociation-diffusion of hydrogen therethrough.

2. The gas separation membrane as set forth in claim 1, in which the increase in porosity from the first surface to the second surface is due to an increase in the size of the metal particles from the first surface to the second surface.

3. The gas separation membrane as set forth in claim 1, in which the increase in porosity from the first surface to the second surface is due to a decrease in the degree of compaction of the metal particles from the first surface to the second surface.

4. The gas separation membrane as set forth in claim 1, in which the chemisorption-dissociation-diffusion coating is a metal coating.

5. The gas separation membrane as set forth in claim 4, in which the porous body further includes a layer of ceramic particles interposed between the metal particles and the metal coating.

6. The gas separation membrane as set forth in claim 1, in which the transmission member includes a catalytic enhancement structured to increase the concentration of hydrogen in the gas stream.

7. The gas separation membrane as set forth in claim 6, in which the catalytic enhancement includes a plurality of particles of catalytic material combined with the metal particles of the porous body.

8. The gas separation membrane as set forth in claim 6, in which the catalytic enhancement includes a layer of catalytic material disposed on the porous body opposite the chemisorption-dissociation-diffusion coating.

9. A gas separation membrane for separating hydrogen from a gas stream, the gas separation membrane comprising:
   a transmission member including a porous body of metal particles compacted and bonded together and a chemisorption-dissociation-diffusion coating;
   the porous body having a first surface and a second surface opposite one another, the porosity of the porous body increasing from the first surface to the second surface, the metal particles including a quantity of at least one of metal fibers and metal powder;
   the chemisorption-dissociation-diffusion coating being disposed on the first surface; and
   the gas separation membrane being structured to receive the gas stream against one of the chemisorption-dissociation-diffusion coating and the second surface and permeate a quantity of hydrogen through the gas separation membrane and out of the other of the chemisorption-dissociation-diffusion coating and the second surface, the chemisorption-dissociation-diffusion coating being structured to permit chemisorption-dissociation-diffusion of hydrogen therethrough;
   the transmission member including a catalytic enhancement structured to increase the concentration of hydrogen in the gas stream;
   the catalytic enhancement including a layer of catalytic material disposed on the porous body opposite the chemisorption-dissociation-diffusion coating; and
   in which the transmission member includes a ceramic-based washcoat opposite the chemisorptiondissociation-diffusion coating, the layer of catalytic material being disposed on the washcoat.

10. The gas separation membrane as set forth in claim 8, in which the catalytic enhancement includes a plurality of particles of catalytic material disposed on the porous body, the particles of catalytic material include particles of at least one of perovskite, zeolite, and spinel.

11. A gas separation membrane for separating hydrogen from a gas stream, the gas separation membrane comprising:
a transmission member including a porous body of metal particles compacted and bonded together and a chemisorption-dissociation-diffusion coating;
the porous body having a first surface and a second surface opposite one another, the porosity of the porous body increasing from the first surface to the second surface, the metal particles including a quantity of at least one of metal fibers and metal powder;
the chemisorption-dissociation-diffusion coating being disposed on the first surface; and
the gas separation membrane being structured to receive the gas stream against one of the chemisorption-dissociation-diffusion coating and the second surface and permeate a quantity of hydrogen through the gas separation membrane and out of the other of the chemisorption-dissociation-diffusion coating and the second surface, the chemisorption-dissociation-diffusion coating being structured to permit chemisorption-dissociation-diffusion of hydrogen therethrough;
the transmission member including a catalytic enhancement structured to increase the concentration of hydrogen in the gas stream; and
in which the catalytic enhancement includes a coating of catalytic material disposed on the outer surface of at least one of the metal particles of the porous body.

12. The gas separation membrane as set forth in claim 6, in which the catalytic enhancement includes one of platinum, palladium, and rhodium.

13. The gas separation membrane as set forth in claim 1, further comprising a support structure, the transmission member being mounted on the support structure.

14. The gas separation membrane as set forth in claim 13, in which the support structure includes at least one of a metal mesh and a perforated metal plate.

15. The gas separation membrane as set forth in claim 14, in which the transmission member is disposed adjacent the support structure.

16. A gas separation membrane for separating hydrogen from a gas stream, the gas separation membrane comprising:
a transmission member including a porous body of metal particles compacted and bonded together and a chemisorption-dissociation-diffusion coating;
the porous body having a first surface and a second surface opposite one another, the porosity of the porous body increasing from the first surface to the second surface, the metal particles including a quantity of at least one of metal fibers and metal powder;
the chemisorption-dissociation-diffusion coating being disposed on the first surface; and
the gas separation membrane being structured to receive the gas stream against one of the chemisorption-dissociation-diffusion coating and the second surface and permeate a quantity of hydrogen through the gas separation membrane and out of the other of the chemisorption-dissociation-diffusion coating and the second surface, the chemisorption-dissociation-diffusion coating being structured to permit chemisorption-dissociation-diffusion of hydrogen therethrough;
a support structure, the transmission member being mounted on the support structure;
the support structure including at least one of a metal mesh and a perforated metal plate; and
in which the support structure extends through the transmission member.

17. A gas separation membrane for separating hydrogen from a gas stream, the gas separation membrane comprising:
a transmission member including a porous body, a chemisorption-dissociation-diffusion coating, and a catalytic enhancement, the transmission member having a first surface and an opposite second surface;
the porous body including a plurality of metal particles compacted and bonded together, the metal particles including a quantity of at least one of metal fibers and metal powder;
the catalytic enhancement being structured to increase the concentration of hydrogen in the gas stream; and
the gas separation membrane being structured to receive the gas stream against one of the first and second surfaces and permeate at least partially via chemisorption-dissociation-diffusion transport a quantity of hydrogen through the gas separation membrane and out of the other of the first and second surfaces.

18. The gas separation membrane as set forth in claim 17, in which the catalytic enhancement includes a plurality of particles of catalytic material combined with the metal particles of the porous body.

19. The gas separation membrane as set forth in claim 17, in which the catalytic enhancement includes a layer of catalytic material on the porous body.

20. A gas separation membrane for separating hydrogen from a gas stream, the gas separation membrane comprising:
a transmission member including a porous body and a catalytic enhancement, the transmission member having a first surface and an opposite second surface;
the porous body including a plurality of metal particles compacted and bonded together, the metal particles including a quantity of at least one of metal fibers and metal powder;
the catalytic enhancement being structured to increase the concentration of hydrogen in the gas stream;
the gas separation membrane being structured to receive the gas stream against one of the first and second surfaces and permeate a quantity of hydrogen through the gas separation membrane and out of the other of the first and second surfaces;
in which the catalytic enhancement includes a layer of catalytic material on the porous body; and
in which the transmission member includes a ceramic-based washcoat on the porous body, the layer of catalytic material being disposed on the washcoat.

21. The gas separation membrane as set forth in claim 19, in which the layer of catalytic material includes a plurality of particles of catalytic material disposed on the porous body, the particles of catalytic material including particles of at least one of perovskite, zeolite, and spinel.

22. A gas separation membrane for separating hydrogen from a gas stream, the gas separation membrane comprising:
a transmission member including a porous body and a catalytic enhancement, the transmission member having a first surface and an opposite second surface;
the porous body including a plurality of metal particles compacted and bonded together, the metal particles including a quantity of at least one of metal fibers and metal powder;

the catalytic enhancement being structured to increase the concentration of hydrogen in the gas stream;

the gas separation membrane being structured to receive the gas stream against one of the first and second surfaces and permeate a quantity of hydrogen through the gas separation membrane and out of the other of the first and second surfaces; and in which the catalytic enhancement includes a coating of catalytic material disposed on the outer surface of at least one of the metal particles of the porous body.

23. The gas separation membrane as set forth in claim 17, in which the porosity of the transmission member increases from the first surface to the second surface.

24. The gas separation membrane as set forth in claim 23, in which the increase in porosity from the first surface to the second surface is due to an increase in the size of the metal particles from the first surface to the second surface.

25. The gas separation membrane as set forth in claim 23, in which the increase in porosity from the first surface to the second surface is due to a decrease in the degree of compaction of the metal particles from the first surface to the second surface.

26. The gas separation membrane as set forth in claim 25, in which the transmission member further includes a layer of ceramic particles disposed on the porous body.

27. The gas separation membrane as set forth in claim 17, further comprising a support structure, the transmission member being mounted on the support structure.

28. The gas separation membrane as set forth in claim 27, in which the support structure includes at least one of a metal mesh and a perforated metal plate.

29. The gas separation membrane as set forth in claim 28, in which the transmission member is disposed adjacent the support structure.

30. A gas separation membrane for separating hydrogen from a gas stream, the gas separation membrane comprising:

a transmission member including a porous body and a catalytic enhancement, the transmission member having a first surface and an opposite second surface;

the porous body including a plurality of metal particles compacted and bonded together, the metal particles including a quantity of at least one of metal fibers and metal powder;

the catalytic enhancement being structured to increase the concentration of hydrogen in the gas stream;

the gas separation membrane being structured to receive the gas stream against one of the first and second surfaces and permeate a quantity of hydrogen through the gas separation membrane and out of the other of the first and second surfaces;

a support structure, the transmission member being mounted on the support structure;

the support structure including at least one of a metal mesh and a perforated metal plate; and in which the support structure extends through the transmission member.

31. The gas separation membrane as set forth in claim 17, in which the catalytic enhancement includes one of platinum, palladium, and rhodium.

* * * * *